(12) United States Patent
Flasher (10) Patent No.: US 10,226,786 B2
(45) Date of Patent: Mar. 12, 2019

(54) POWDER PIPE COATING BOOTH

(71) Applicant: GEMA SWITZERLAND GMBH, St. Gallen (CH)

(72) Inventor: Philip S. Flasher, Brownsburg, IN (US)

(73) Assignee: GEMA SWITZERLAND GMBH, St. Gallen (CH)

( * ) Notice: Subject to any disclaimer, the term of this patent is extended or adjusted under 35 U.S.C. 154(b) by 352 days.

(21) Appl. No.: 13/967,443

(22) Filed: Aug. 15, 2013

(65) Prior Publication Data

US 2015/0047561 A1    Feb. 19, 2015

(51) Int. Cl.
| | |
|---|---|
| *B05B 5/08* | (2006.01) |
| *B05B 14/43* | (2018.01) |
| *B05B 16/00* | (2018.01) |
| *B05B 13/02* | (2006.01) |
| *C21D 9/08* | (2006.01) |

(52) U.S. Cl.
CPC .............. *B05B 14/43* (2018.02); *B05B 5/081* (2013.01); *B05B 5/084* (2013.01); *B05B 13/0207* (2013.01); *B05B 13/0228* (2013.01); *B05B 16/95* (2018.02); *C21D 9/08* (2013.01); *Y02P 70/36* (2015.11)

(58) Field of Classification Search
None
See application file for complete search history.

(56) References Cited

U.S. PATENT DOCUMENTS

| | | | | |
|---|---|---|---|---|
| 3,108,022 A | * | 10/1963 | Church ................... | B05C 19/02 118/404 |
| 3,439,649 A | * | 4/1969 | Zupan ...................... | B05B 5/14 118/309 |
| 4,231,289 A | * | 11/1980 | Domicent .......... | B05B 15/1214 118/326 |
| 5,002,594 A | * | 3/1991 | Merritt ............... | B01D 46/0058 55/294 |
| 5,131,350 A | | 7/1992 | Buschor | |
| 5,153,028 A | * | 10/1992 | Shutic ................. | B05B 15/1211 118/312 |
| 5,399,198 A | | 3/1995 | Ghaisas | |
| 5,755,246 A | * | 5/1998 | Carl ........................ | B08B 15/02 134/131 |
| 5,997,959 A | * | 12/1999 | Lebioda .................... | B05B 5/08 118/624 |

(Continued)

*Primary Examiner* — Charles Capozzi
(74) *Attorney, Agent, or Firm* — Kinney & Lange, P.A.

(57) ABSTRACT

Apparatus for coating a heated pipe section with a fusible powder includes a booth enclosing a powder application volume, at least one powder dispensing device for dispensing powder supplied to the device in the direction of the heated pipe section as the heated pipe section passes through the volume, and a filter mechanism coupled to the booth for extracting from the booth a stream of air entraining fusible powder that does not stick to the heated pipe section and extracting the fusible powder that does not stick to the heated pipe section from the volume. The apparatus further includes an opening between the volume and the filter mechanism. The opening permits the mixing of cooler air into the stream of air entraining fusible powder that does not stick to the heated pipe section before the stream of air entraining fusible powder that does not stick to the heated pipe section reaches the filter mechanism.

6 Claims, 7 Drawing Sheets

(56) References Cited

U.S. PATENT DOCUMENTS

| | | |
|---|---|---|
| 7,837,130 B1 | 11/2010 | Lowery |
| 7,878,420 B2 | 2/2011 | Thomas et al. |
| 7,968,206 B2 | 6/2011 | Johnson et al. |
| 7,997,963 B2 | 8/2011 | Ainsworth et al. |
| 8,113,140 B2 | 2/2012 | Yamaguchi et al. |
| 8,123,147 B2 | 2/2012 | Fulkerson et al. |
| 8,132,743 B2 | 3/2012 | Fulkerson et al. |
| 8,166,912 B2 | 5/2012 | Ko |
| 8,268,381 B2 | 9/2012 | Whiteford et al. |
| 8,282,753 B2 | 10/2012 | Stelter et al. |
| 8,292,197 B2 | 10/2012 | Ballu et al. |
| 8,309,232 B2 | 11/2012 | Daeubler et al. |
| 8,312,835 B2 | 11/2012 | Shutic et al. |
| 8,329,258 B2 | 12/2012 | Seitz |
| 8,329,781 B2 | 12/2012 | Bardelli |
| 8,333,570 B2 | 12/2012 | Fulkerson et al. |
| 8,353,469 B2 | 1/2013 | Fulkerson et al. |
| 8,356,574 B2 | 1/2013 | Wurster |
| 8,372,478 B1 | 2/2013 | Harris et al. |
| 8,381,381 B2 | 2/2013 | Daniels |
| 8,420,180 B2 | 4/2013 | Buczek et al. |
| 8,421,180 B2 | 4/2013 | Buczek et al. |
| 8,431,180 B2 | 4/2013 | Fritz et al. |
| 2005/0011438 A1* | 1/2005 | Ainsworth .......... B05B 15/1211 118/326 |
| 2005/0178851 A1* | 8/2005 | Shutic ................ B05B 7/1454 239/124 |
| 2007/0062444 A1* | 3/2007 | Shutic ................ B05B 15/1214 118/309 |

\* cited by examiner

POWDER PIPE COATING BOOTH

BACKGROUND

Fusible pulverulent material (hereinafter sometimes powder) coating systems are known. An illustrative, but by no means exhaustive, list of such systems includes U.S. Pat. Nos. 8,431,180; 8,420,180; 8,381,381; 8,372,478; 8,356,574; 8,353,469; 8,333,570; 8,329,781; 8,329,258; 8,312,835; 8,309,232; 8,292,197; 8,282,753; 8,268,381; 8,166,912; 8,132,743; 8,123,147; 8,113,140; 7,997,963; 7,968,206; 7,878,420; 7,837,130; 5,399,198; and, 5,131,350. The disclosures of these references are hereby incorporated herein by reference. This listing is not intended to be a representation that a complete search of all relevant art has been made, or that no more pertinent art than that listed exists, or that the listed art is material to patentability. Nor should any such representation be inferred.

Powder pipe coating systems typically include booths containing several powder dispensing devices (hereinafter sometimes powder guns, or guns). The number of guns depends, among other things, upon the quantity of powder which must be dispensed per unit time (per minute, for example) to provide a desired powder film build on the pipe as the pipe passes through the booth. Typically, lengths of pipe are heated to, for example, about 450° F. (about 232° C.) prior to passage through the booth. The ends of the pipe sections are masked to permit later welding of powder coated pipe sections to one another. The pipe sections are passed through the booth as powder is dispensed by the guns onto them. The powder essentially fuses on contact with the hot surface of the sections of pipe. The pipe is then typically water quenched to bring its temperature below the powder's fusion temperature, stacked and permitted to cool, completing the fusion of the protective coating to the outer surface of the pipe.

Typically, the oversprayed powder exits the booth and passes into ductwork coupled to, for example, a cyclone or baghouse for removal of the oversprayed powder from the airstream and, where possible, recovery of the oversprayed powder for recirculation. However, the presence of the powder in the ductwork constitutes a hazard, and, as a result, in order to comply with, for example, Occupational Safety and Health Act requirements, the ductwork/collection vessel is typically required to have dust/explosion suppression systems such as, for example, those available from Fike Corporation or Fenwal Protection Systems.

A better solution would be to permit the overspray-laden airstream to pass through a filter enclosure attached to, or closely associated with, the booth, that is, without intermediate ductwork between the booth and a baghouse or cyclone, so that the powder could be removed from the airstream in the immediate vicinity. There would then be no need for the ductwork and its associated components, such as, for example, the dust/explosion suppression system. Ideally, the filter enclosure could be integrated into the booth. The problem with such a facility, however, is that any oversprayed powder remains hot as the overspray exits the spray area, typically hotter than its melting temperature, from its passage near the pipe. Thus, the powder impacting against the filter elements is prone to fuse to the elements, fairly quickly plugging them and rendering the filter inoperable.

SUMMARY

Apparatus for coating a heated substrate with a fusible powder includes a booth enclosing a powder application volume, and at least one powder dispensing device for dispensing powder supplied to the device in the direction of the heated substrate as the heated substrate passes through the volume. A filter mechanism is coupled to the booth for extracting from the booth a stream of air entraining fusible powder that does not stick to the heated substrate and extracting the fusible powder that does not stick to the heated substrate from the volume. An opening between the volume and the filter mechanism permits the mixing of cooler air into the stream of air entraining fusible powder that does not stick to the heated substrate before the stream of air entraining fusible powder that does not stick to the heated substrate reaches the filter mechanism.

Illustratively, the booth includes an inlet and an outlet, the inlet and outlet provided with sliding doors.

Illustratively, the booth includes an inlet and an outlet, the inlet and outlet provided with removable partitions having openings therethrough. The openings are of a size to permit passage therethrough of the substrate to be coated.

Illustratively, the at least one powder dispensing device comprises a plurality of powder dispensing devices.

Further illustratively, the apparatus includes an electrostatic power supply including a high magnitude terminal of the supply coupled to a charging electrode of the powder dispensing device and a low magnitude terminal coupled to the substrate as the substrate passes through the booth. Electrostatically charged powder dispensed from the powder dispensing device forms a charged powder cloud surrounding the substrate. Charged powder coating from the powder cloud is thereby attracted to the heated substrate.

Illustratively, the filter mechanism comprises a filter which captures the air entrained fusible powder that does not stick to the heated substrate thereon, reducing the ability of the filter to permit the entraining air to pass therethrough. The mixing of cooler air into the stream of air entraining fusible powder that does not stick to the heated substrate permits a pulse of air in a direction opposite the normal direction of airflow through the filter to dislodge fusible powder that does not stick to the heated substrate therefrom.

Illustratively, the opening is adjustable to lower the temperature of the fusible powder that does not stick to the heated substrate below the fusion temperature of the fusible powder that does not stick to the heated substrate.

BRIEF DESCRIPTION OF THE DRAWINGS

The invention may best be understood by referring to the following detailed description and accompanying drawings. In the drawings:

FIG. 8 illustrates a perspective view of certain details of a powder coating installation incorporating the present invention; and, FIG. 8a illustrates an end view of certain details of a powder coating installation incorporating the present invention.

DETAILED DESCRIPTIONS OF ILLUSTRATIVE EMBODIMENTS

Figure 1:
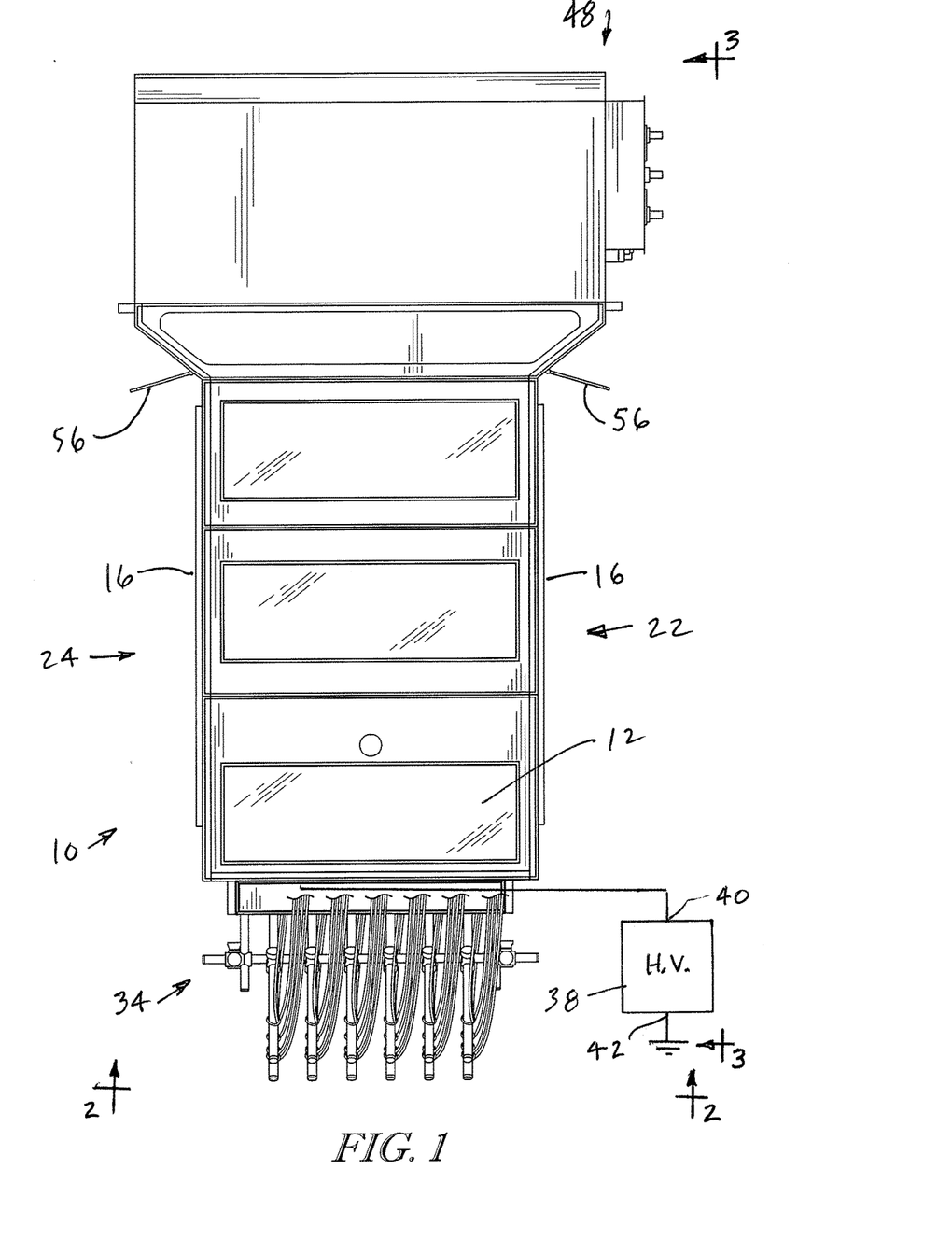
FIG. 1 illustrates a top plan view of a powder coating installation incorporating the present invention.
Figure 2:
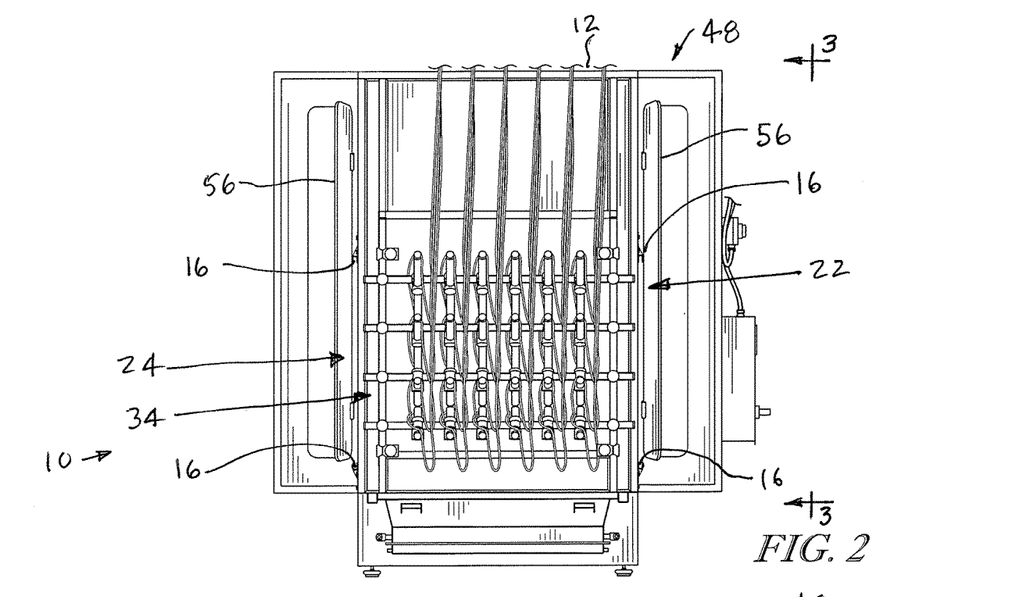
FIG. 2 illustrates a front elevational view of the installation illustrated in FIG. 1, taken generally along section lines 2-2 of FIG. 1.
Figure 3:
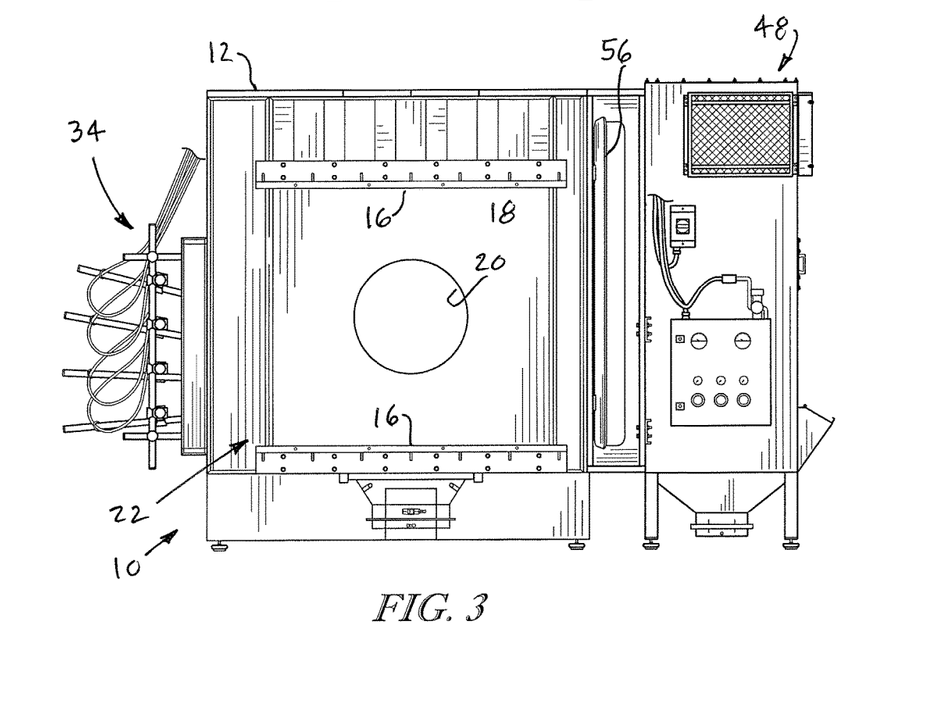
FIG. 3 illustrates a side or end elevational view of the installation illustrated in FIGS. 1-2, taken generally along section lines 3-3 of FIGS. 1-2.
Figure 4:
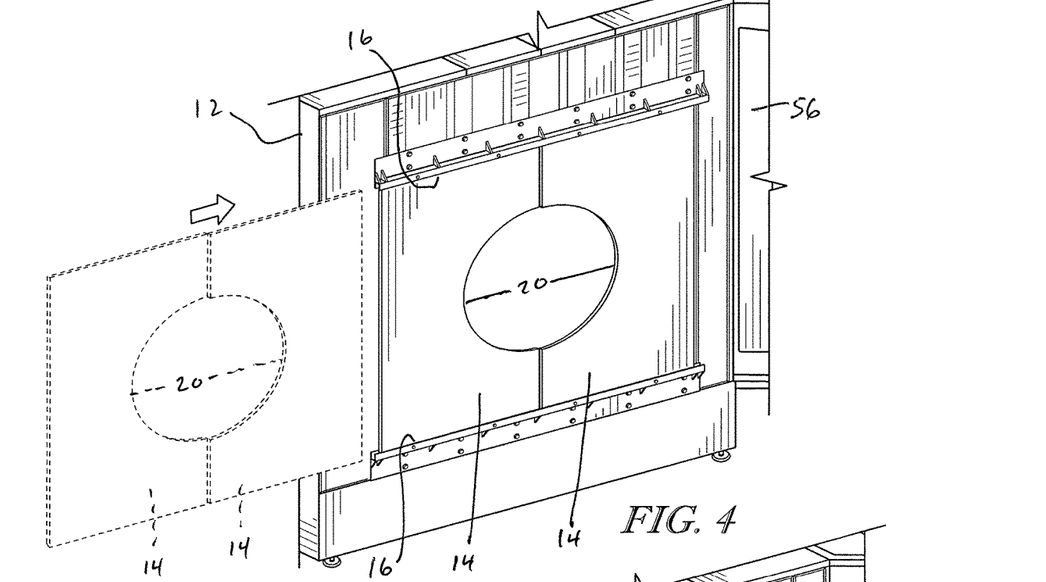
FIGS. 4 and 4A illustrate alternative construction details of the installation illustrated in FIGS. 1-3.
Figure 4A:
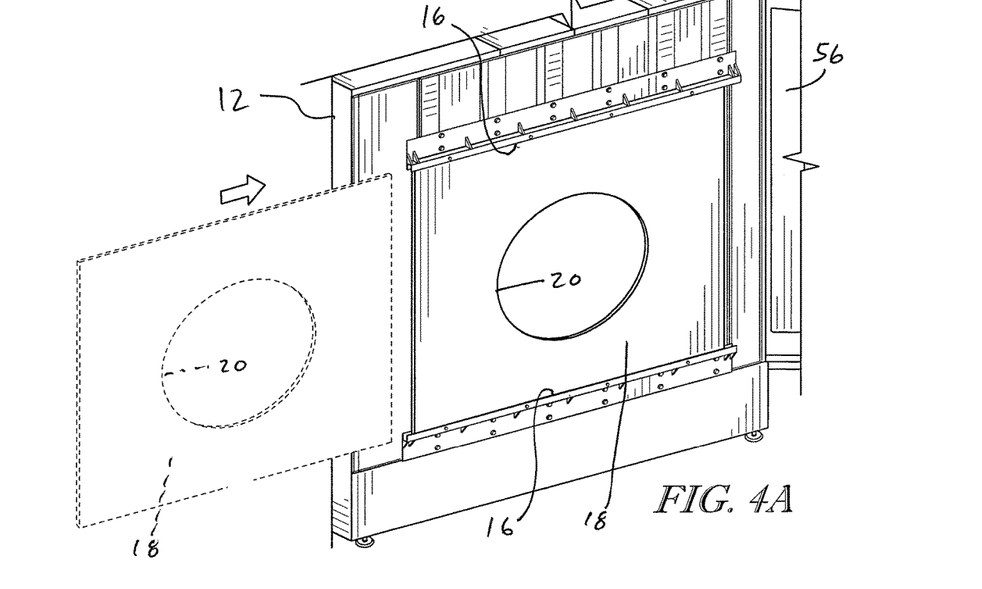
Figure 5:
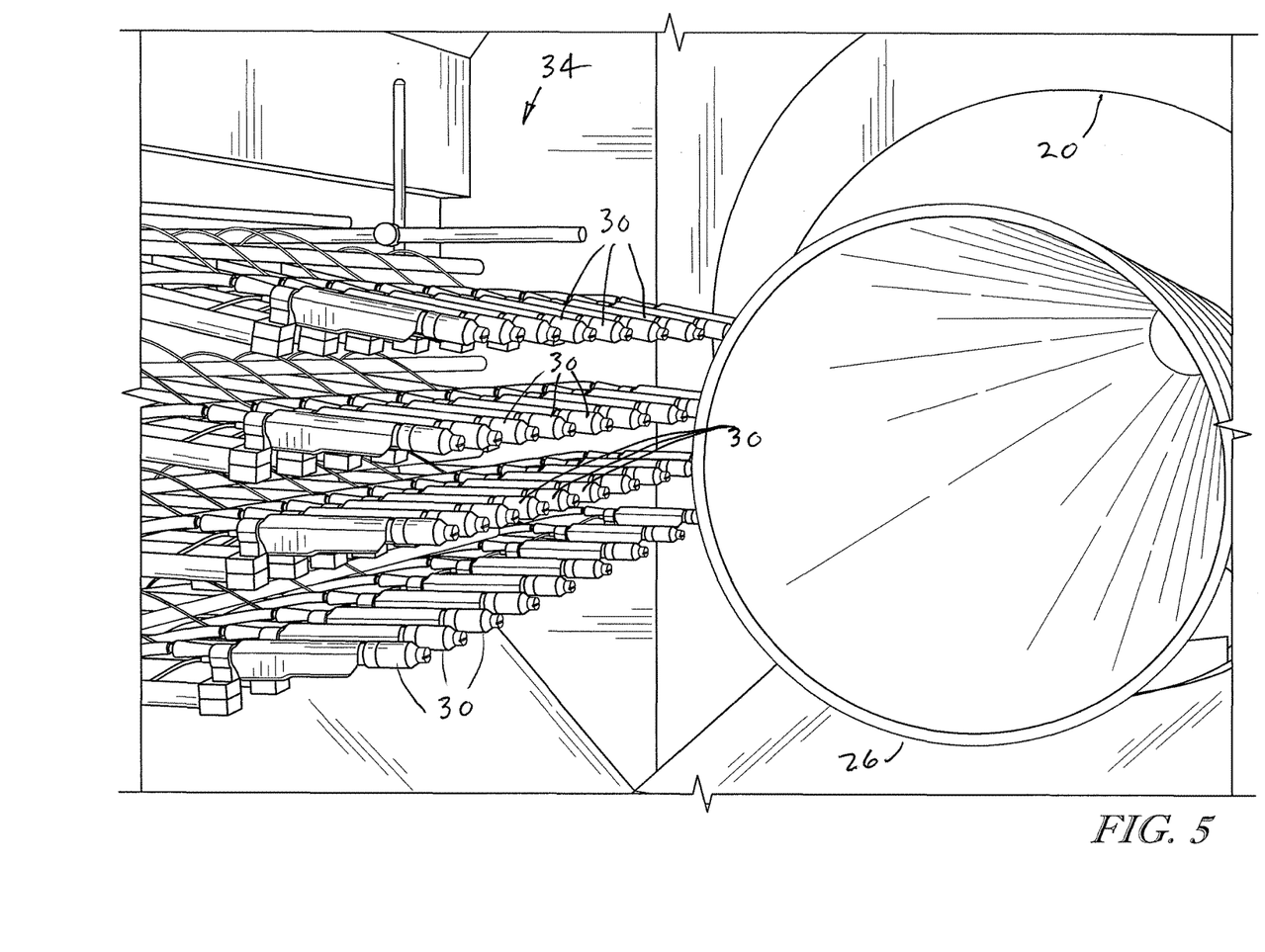
FIG. 5 illustrates a perspective view of certain details of a powder coating installation incorporating the present invention.
Figure 6:
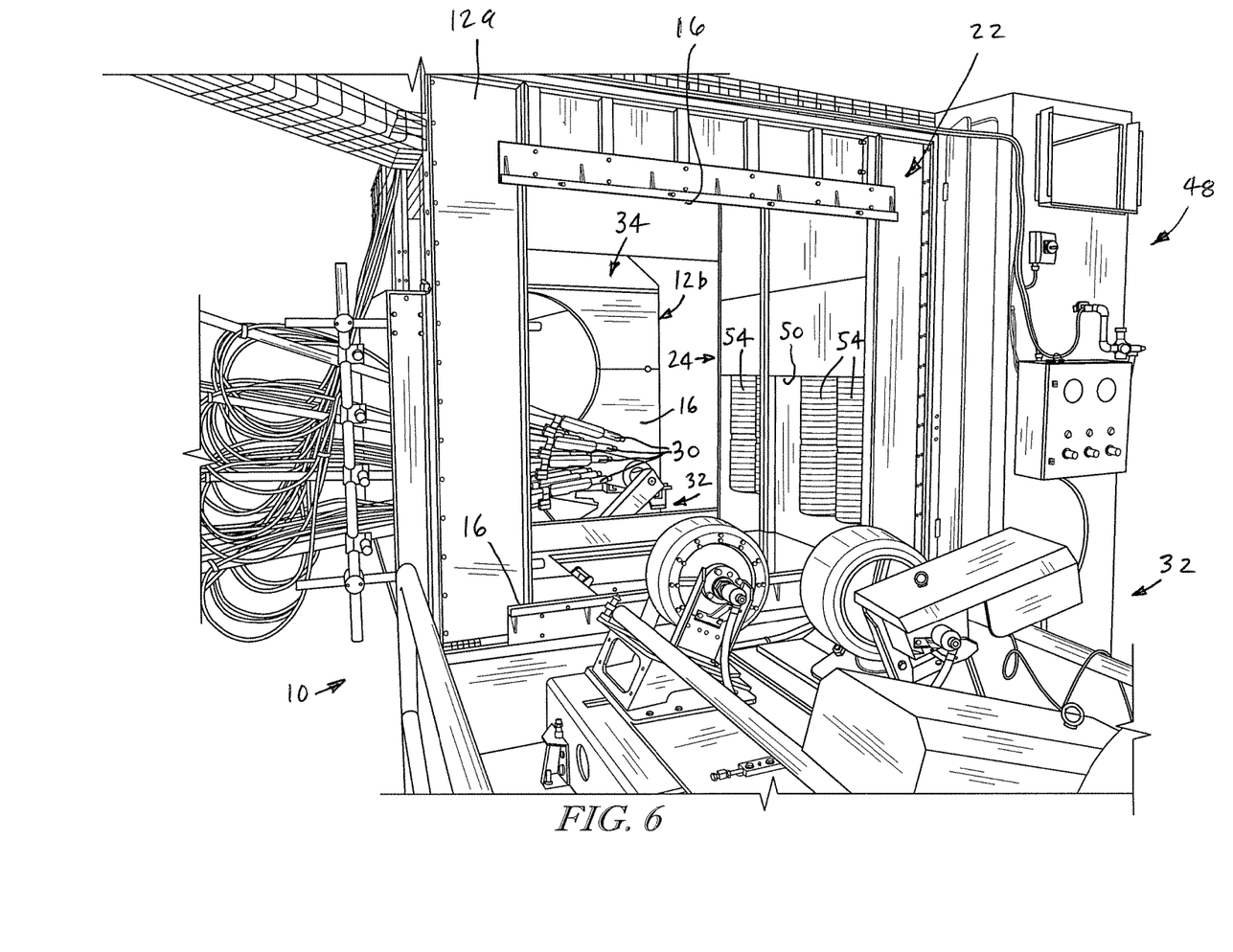
FIG. 6 illustrates a perspective view of certain details of a powder coating installation incorporating the present invention.
Figure 7:
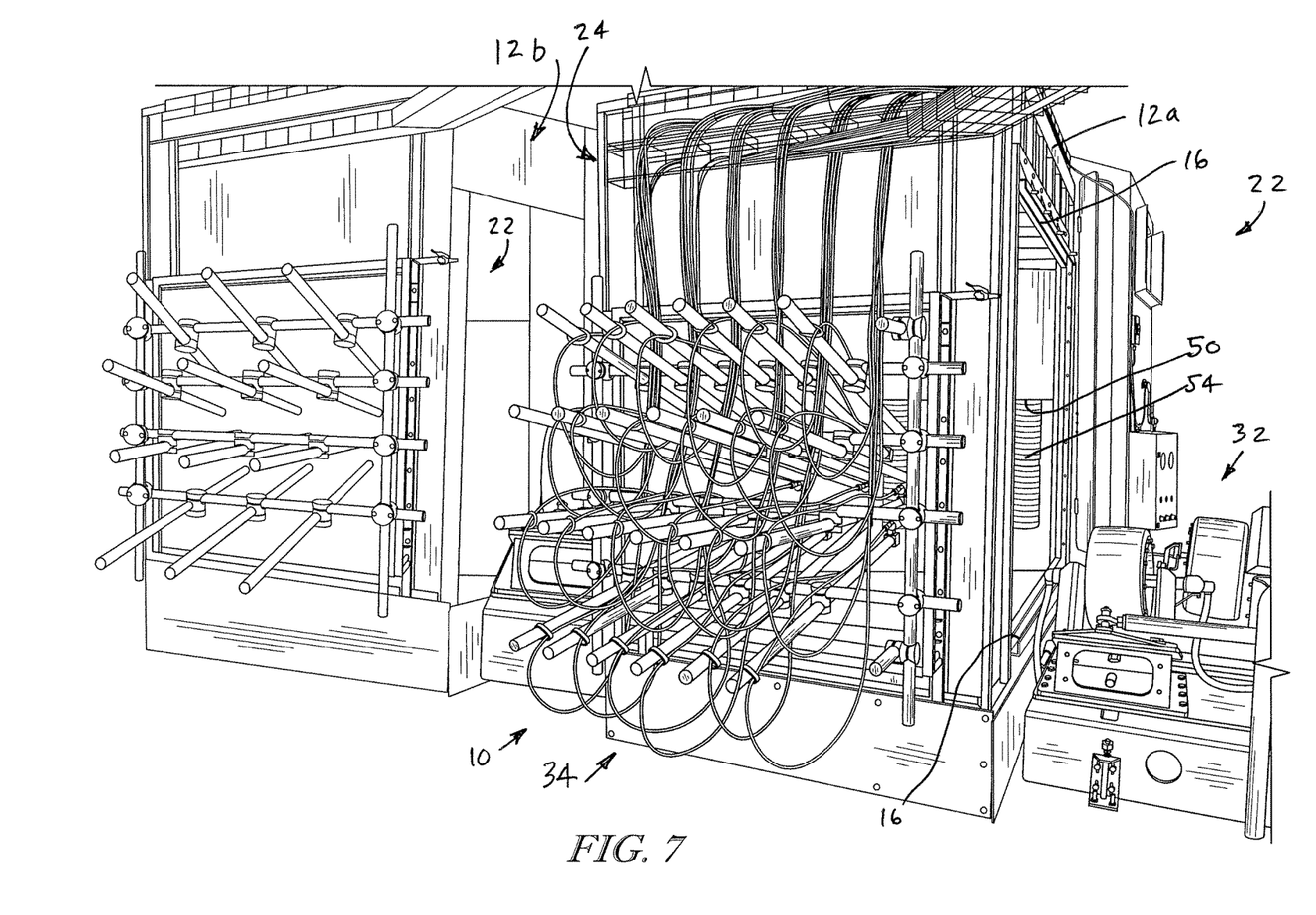
FIG. 7 illustrates a perspective view of certain details of a powder coating installation incorporating the present invention.
Figures 8, 8A:
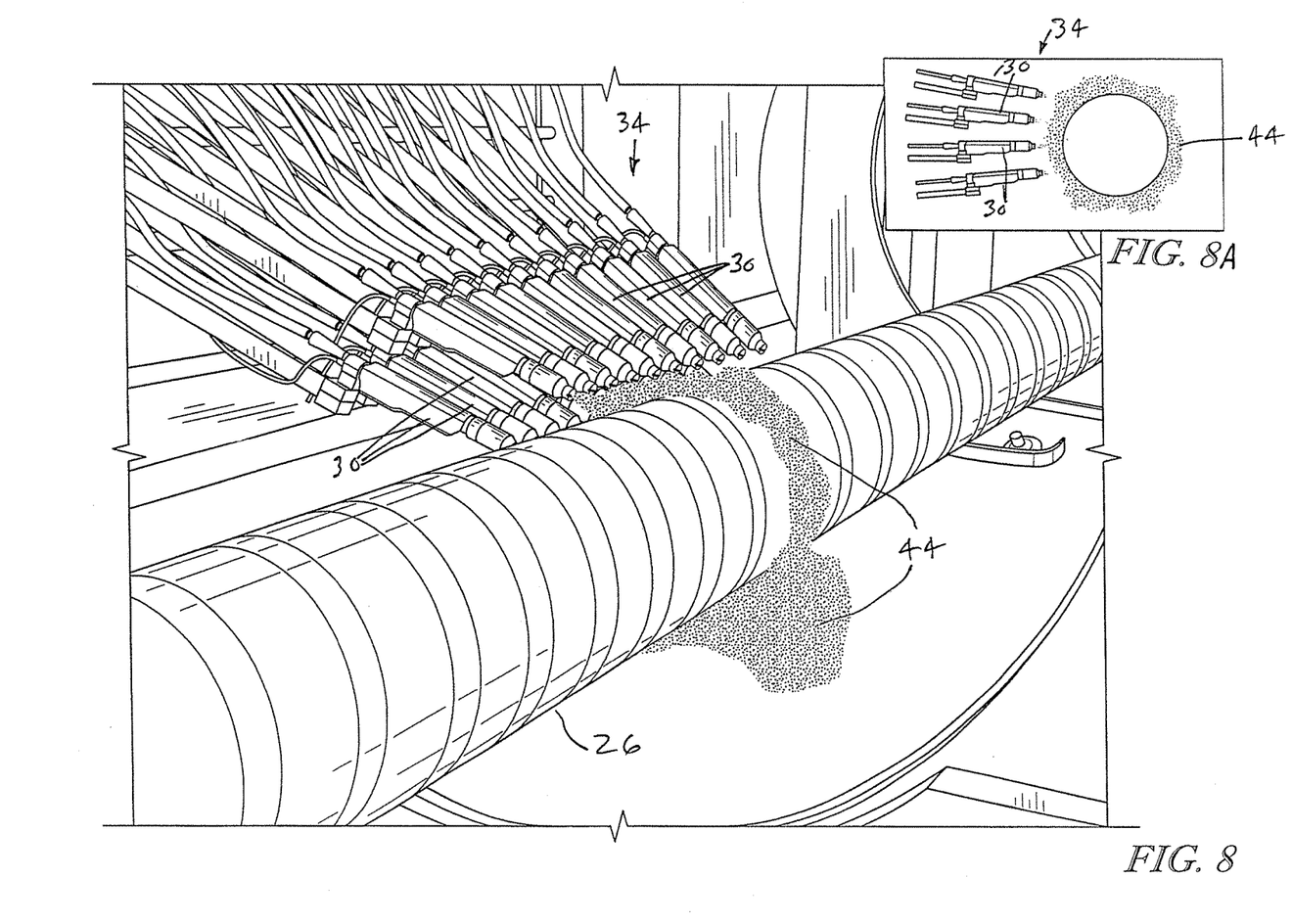

The illustrated powder pipe coating installation 10 includes a booth 12 with sliding doors 14 on tracks 16 or removable partitions 18 having openings 20 therethrough at the booth 12 inlet 22 and outlet 24 ends. In sliding door 14 embodiments, the sliding doors 14 can be opened just enough that the pipe 26 to be coated can pass through. Cutouts or openings 20 are provided in the doors 14 or the removable partitions 18 at the inlet 22 and outlet 24 ends of the booth 12 are no larger than is necessary to permit passage therethrough of the pipe 26 to be coated. Typical pipe 26 diameters in the range of 2 inches (about 5 cm) to 60 inches (about 155 cm) are not uncommon, so the equipment 12, 14, 18 must accommodate considerable variation in the available opening 20 sizes.

The installation also includes a plurality of powder guns 30, such as Gema model GA02 guns, for dispensing the powder which is intended to coat the pipe 26 sections. Typically, a drive system 32 of known configuration, including frictional driving and idler wheels that push and rotate the pipe sections, drives the pipe 26 sections through the booth 12.

Typically the powder is electrostatically charged and the pipe 26 sections are maintained at essentially ground potential in accordance with known principles during the powder coating operation, making the powder coating operation considerably more efficient in terms of the amount of powder applied to the pipe 26 sections versus the amount of powder dispensed by the guns 30. Additionally, this electrostatic charging of the powder means that all of the guns 30 can be mounted in a single array 34, for example, on one side of the booth 12, rather than all the way around the pipe 26 sections as the pipe 26 sections pass through the booth 12, and a substantially uniform thickness of coating around the entire surface 36 of the pipe 26 sections will still be achieved, again in accordance with known principles. While the Gema model GA02 guns include built-in electrostatic power supplies, for purposes of illustration, (an) electrostatic power supply(ies) 38 is (are) illustrated diagrammatically at the installation. The high magnitude terminal(s) 40 of the supply(ies) 38 is (are) coupled to the charging electrodes of the guns. The low magnitude terminal(s) 42 of the supply(ies) is (are) coupled to ground. The low magnitude terminal(s) 42 is (are) also coupled via the rollers of the drive system 32 to the pipe 26 sections as the pipe 26 sections pass before the guns 30. The charged powder is attracted from the charged powder cloud 44 which surrounds the pipe 26 sections onto the pipe 26 sections, coating them.

Sometimes, two different coatings, such as, for example, a fusion bonded epoxy coating (hereinafter sometimes FBE) and an abrasion resistant overlay (hereinafter sometimes ARO), are applied to the pipe sections 26. In some circumstances, the FBE and ARO are applied by more upstream and more downstream groups of guns 30, respectively, in the same booth 12. In other circumstances, the FBE and ARO are applied in separate more upstream and more downstream booths 12a, 12b. This latter arrangement simplifies powder recycling, since if the FBE and ARO are applied in the same booth 12, the overspray of the FBE and the overspray of the ARO will almost inevitably be mixed, complicating or precluding recovery and recycling of overspray.

Adjacent the booth 12 is a cartridge filter system 48. The illustrated system 48 is from a Gema® Smart™ B dust collector. This system 48 includes fans for pulling air containing oversprayed powder through an opening 50 in the side 52 of the booth 12 opposite the array 34 of guns 30. As it enters the opening 50, the air is pulled through cartridge filters 54. The filters separate the oversprayed powder from the air stream, depositing the oversprayed powder on the outsides of the cartridges 54. It is on the outsides of these cartridges 54 that the deposited overspray would fuse, were it not for the invention. Instead, a set of doors 56 is provided on the booth 12 between the booth 12 sidewall 52 and the filter 54 housing sidewall 60. The doors 56 are opened some amount to permit cooler room air to enter into the overspray-containing airstream, mixing with it and cooling the oversprayed powder entrained in the airstream to below its fusion temperature.

With the addition of this cooling air, the oversprayed powder deposited on the outsides of the cartridges 54 can be dislodged during pulsedown of the cartridges 54, the short pulse of air intermittently blown backward through the cartridges 54 by the filter mechanism 48, dislodging the captured powder from the filter cartridges 54 so that the powder falls to the floor of the filter mechanism 48 for recovery/recycling. The mixing of the cool air with the airstream containing the oversprayed powder requires that the capacity of the filter mechanism 48 be greater than the capacity which would otherwise be adequate for the booth 12. For example, if the booth 12 would otherwise be provided with a 6000 scfm filter system, the booth 12 with interjected plenum containing doors 56 may require a 9000 scfm filter system 48, with the additional 3000 scfm being introduced as cooling air through the doors 56. The addition of a significant amount, in this example, 50% of the primary airflow, of air at essentially room temperature quickly lowers the temperature of the overspray suspended in the airstream passing over the hot pipe 26 sections below the overspray's fusion temperature. This cooling results in overspray that impacts on the cartridge 54 surfaces but does not fuse to these surfaces. This filtered overspray is then able to be blown off by the above-described pulsedown air blasts, and recovered.

After coating of the pipe 26 section is complete, it is typically water quenched to bring its temperature below the powder's fusion temperature, fixing the coating on the surface 36.

What is claimed is:

1. Apparatus for coating a heated substrate in the form of a pipe with a fusible powder, the apparatus comprising:
   a booth enclosing a powder application volume as part of a volume enclosed by the booth and smaller than the volume enclosed by the booth, the booth includes an inlet and an outlet for the pipe to pass longitudinally through the booth powder application volume between the inlet and the outlet;
   at least one spray gun arranged in a single array only on a first side of the booth for dispensing powder supplied to the at least one spray gun in a direction substantially perpendicular to a passing direction of the heated substrate through the powder application volume from the inlet to the outlet, 
a dust collector directly coupled to the booth at a first opening arranged in a second side of the booth opposite to the first side of the booth for extracting from the booth an overspray-laden airstream generated during the dispensing of the powder by means of the at least one spray gun, the overspray-laden airstream including a stream of air entraining at least a portion of fusible powder that does not stick to the heated substrate, and for extracting the portion of entrained fusible powder that does not stick to the heated substrate from the powder application volume, and a second opening in the booth directly between the powder application volume and the dust collector, the second opening being sized and positioned to permit, during the dispensing of the powder by the at least one spray gun, the mixing of cooler room air from outside of the booth at essentially room temperature into the stream of air entraining fusible powder that does not stick to the heated substrate to lower the temperature of the portion of entrained fusible powder that does not stick to the heated substrate to a temperature below the fusion temperature of the fusible powder before the portion of entrained fusible powder reaches the dust collector;

wherein the dust collector comprises:

at least one fan adapted to pull the overspray-laden airstream from the booth through the first opening; and a filter positioned adjacent to the first opening between the first opening and the at least one fan, the filter adapted to capture the portion of entrained fusible powder that enters the first opening such that the portion of entrained fusible powder is deposited on the outside of the filter;

wherein the dust collector is adapted to intermittently generate a pulse of air in a direction opposite the normal direction of airflow through the filter to dislodge the fusible powder from the outside of the filter such that the powder falls to the floor of the dust collector for recovery or recycling.

2. The apparatus of claim 1, wherein at least one of the inlet and outlet is provided with sliding doors.

3. The apparatus of claim 1, wherein at least one of the inlet and outlet is provided with a removable partition having an opening therethrough, the opening of a size corresponding to a diameter of the pipe so that the opening no larger than necessary to permit passage therethrough of the substrate to be coated.

4. The apparatus of claim 1, wherein the at least one spray gun comprises a plurality of spray guns.

5. The apparatus of claim 1 further including an electrostatic power supply including a high magnitude terminal of the supply coupled to a charging electrode of the at least one spray gun and a low magnitude terminal coupled to the substrate as the substrate passes through the booth, electrostatically charged powder dispensed from the at least one spray gun forming a charged powder cloud surrounding the substrate, a charged powder coating from the powder cloud being attracted to the heated substrate.

6. The apparatus of claim 1, wherein the second opening is adjustable to modulate the amount of cooler air at essentially room temperature for lowering the temperature of the fusible powder that does not stick to the heated substrate below the fusion temperature of the fusible powder that does not stick to the heated substrate.

* * * * *